(12) United States Patent
Suzuki et al.

(10) Patent No.: US 6,192,153 B1
(45) Date of Patent: Feb. 20, 2001

(54) IMAGE PROCESSING DEVICE

(75) Inventors: Michiyuki Suzuki, Yamatokooriyama; Kiwamu Morita, Osaka; Yoshinori Hayashi, Soraku-gun, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/055,298

(22) Filed: Apr. 6, 1998

(30) Foreign Application Priority Data

Apr. 18, 1997 (JP) ................................................. 9-101250

(51) Int. Cl.⁷ ....................................................... H04N 1/40
(52) U.S. Cl. ............................................. 382/199; 382/195
(58) Field of Search ..................................... 382/199, 195, 382/266–269, 176; 358/462

(56) References Cited

U.S. PATENT DOCUMENTS

| | | | |
|---|---|---|---|
| 5,392,137 | * 2/1995 | Okubo | 358/462 |
| 5,515,180 | 5/1996 | Maeda et al. | 358/458 |
| 5,675,664 | 10/1997 | Maeda et al. | 382/199 |
| 5,917,955 | * 6/1999 | Kojima | 382/266 |

FOREIGN PATENT DOCUMENTS

| | | |
|---|---|---|
| 61-194968 | 8/1986 | (JP) . |
| 6150059 | 5/1994 | (JP) . |
| 8149297 | 6/1996 | (JP) . |

* cited by examiner

*Primary Examiner*—Thomas D. Lee
*Assistant Examiner*—Stephen Brinich

(57) ABSTRACT

The object of the invention is to identify accurately which of the plurality of image types each pixel in a document image is included by a small circuit structure. When spacial filtering process is performed to the image signals of a photograph region and a letter region shown by use of a filter with a filter coefficient having a sum of −1 as shown, the image signals shown will be intensified, and by binary coding the same with a threshold "0", an edge detection result could be gained, with no edge portion detected in the photograph region. Therefore, in the identification circuit of the image processing device, the identification on whether or not the observation pixel is included in the photograph region could be easily and accurately be performed based on whether or not the edge portion exists in the local block.

20 Claims, 11 Drawing Sheets

FIG.5A

| Img0 | Img1 | Img2 | Img3 | Img4 |
|---|---|---|---|---|
| Img5 | Img6 | Img7 | Img8 | Img9 |
| Img10 | Img11 | Img12 | Img13 | Img14 |
| Img15 | Img16 | Img17 | Img18 | Img19 |
| Img20 | Img21 | Img22 | Img23 | Img24 |

FIG.5B

| F0 | F1 | F2 | F3 | F4 |
|---|---|---|---|---|
| F5 | F6 | F7 | F8 | F9 |
| F10 | F11 | F12 | F13 | F14 |
| F15 | F16 | F17 | F18 | F19 |
| F20 | F21 | F22 | F23 | F24 |

FIG.6A
EDGE PORTION OF PHOTOGRAPH REGION

| 100 | 100 | 150 | 100 | 100 |
|---|---|---|---|---|
| 100 | 100 | 150 | 100 | 100 |
| 100 | 100 | 150 | 100 | 100 |
| 100 | 100 | 150 | 100 | 100 |
| 100 | 100 | 150 | 100 | 100 |

FIG.6B
EDGE PORTION OF LETTER REGION

| 30 | 30 | 80 | 30 | 30 |
|---|---|---|---|---|
| 30 | 30 | 80 | 30 | 30 |
| 30 | 30 | 80 | 30 | 30 |
| 30 | 30 | 80 | 30 | 30 |
| 30 | 30 | 80 | 30 | 30 |

FIG.6C
$\Sigma(Fi)=0$

| 0 | 0 | 0 |
|---|---|---|
| -1 | 2 | -1 |
| 0 | 0 | 0 |

FIG.6D
FILTER RESULT OF FIG.6A BY FIG.6C

|  |  |  |  |  |
|---|---|---|---|---|
|  | -50 | 100 | -50 |  |
|  | -50 | 100 | -50 |  |
|  | -50 | 100 | -50 |  |
|  |  |  |  |  |

FIG.6E
FILTER RESULT OF FIG.6B BY FIG.6C

|  |  |  |  |  |
|---|---|---|---|---|
|  | -50 | 100 | -50 |  |
|  | -50 | 100 | -50 |  |
|  | -50 | 100 | -50 |  |
|  |  |  |  |  |

FIG.6F
RESULT OF BINARY CODING FIG.6D BY "0"

|  |  |  |  |  |
|---|---|---|---|---|
|  | 0 | 1 | 0 |  |
|  | 0 | 1 | 0 |  |
|  | 0 | 1 | 0 |  |
|  |  |  |  |  |

FIG.6G
RESULT OF BINARY CODING FIG.6E BY "0"

|  |  |  |  |  |
|---|---|---|---|---|
|  | 0 | 1 | 0 |  |
|  | 0 | 1 | 0 |  |
|  | 0 | 1 | 0 |  |
|  |  |  |  |  |

FIG.6H
FILTER RESULT OF FIG.6A BY FIG.2

|  |  |  |  |  |
|---|---|---|---|---|
|  | -150 | -50 | -150 |  |
|  | -150 | -50 | -150 |  |
|  | -150 | -50 | -150 |  |
|  |  |  |  |  |

FIG.6I
FILTER RESULT OF FIG.6B BY FIG.2

|  |  |  |  |  |
|---|---|---|---|---|
|  | -80 | 20 | -80 |  |
|  | -80 | 20 | -80 |  |
|  | -80 | 20 | -80 |  |
|  |  |  |  |  |

FIG.6J
RESULT OF BINARY CODING FIG.6H BY "0"

|  |  |  |  |  |
|---|---|---|---|---|
|  | 0 | 0 | 0 |  |
|  | 0 | 0 | 0 |  |
|  | 0 | 0 | 0 |  |
|  |  |  |  |  |

FIG.6K
RESULT OF BINARY CODING FIG.6I BY "0"

|  |  |  |  |  |
|---|---|---|---|---|
|  | 0 | 1 | 0 |  |
|  | 0 | 1 | 0 |  |
|  | 0 | 1 | 0 |  |
|  |  |  |  |  |

IMAGE PROCESSING DEVICE

TECHNICAL FIELD OF THE INVENTION

The present invention relates to an image processing device constituting an electric file, digital copying machine, facsimile device, scanner and the like, and more particularly, to an image processing device for performing the best processing to each image signal gained by scanning a document, according to the characteristics of each pixel.

BACKGROUND OF THE INVENTION

In digital copying machines and facsimile devices, an image processing device for performing image processing against image signals gained by reading a document comprising a letter portion, a photograph portion or a dot portion, or the mixture of these plurality of portions by CCD image sensors and the like to improve the image quality of the recording image. This image processing is performed by identifying whether the read image type is either a letter image, a photograph image, or a dot image, and according to the identification result, performing the best processing to each pixel.

For example, Japanese Laid-Open Patent Publication No. 6-150059 discloses an invention where document image is divided into blocks comprising a plurality of pixels, and the image type of the document image is identified by matching patterns. In this invention, a plurality of basic patterns are prepared, and by comparing the document image pattern with the basic patterns, the image type of the document image is decided.

Further, in Japanese Laid-Open Patent Publication No. 8-149297, an invention for identifying whether an observation pixel is included in a dot image portion or not by utilizing the periodicity of the image data of dot images and detecting the periodicity of the image data of a line in the document image is disclosed.

Still further, Japanese Laid-Open Patent Publication No. 61-194968 discloses a dot photograph region identification method wherein a pixel inside a block having different signal levels in the main scan direction and the sub scan direction is measured, and by comparing the sum of the change coefficient, identifying whether the observation pixel is of a dot photograph image portion or not.

However, in the image identifying process by matching patterns as disclosed in Japanese Laid-Open Patent Publication No. 6-150059, it is necessary to prepare many patterns beforehand, which leads to the need of a large memory capacity, and less universality.

Further, in the method of detecting the periodicity of the image data of one line as disclosed in Japanese Laid-Open Patent Publication No. 8-149297, there are cases where the dot portion could not be identified reliably, since in the case of a dot region with low density and small dot sizes, dots are rarely placed on one line. Therefore, it is necessary to detect periodicity of the image by plurality of lines in two dimension regions, which leads to necessity of many block memories according to the periodicity of the dots, which further leads to rise of costs.

Even further, according to the invention where continuity of dot photograph portions is detected as is disclosed in Japanese Laid-Open Patent Publication No. 61-194968, the detection of dot regions may be possible, but the identification between the photograph portion having small difference in signal levels with the letter portion is difficult, and accurate identification of dot photograph portions could not be realized.

Therefore, the object of the present invention is to provide an image processing device enabling a reliable identification of whether which pixel of the document image is included in which of the plurality of image regions by a small circuit structure.

SUMMARY OF THE INVENTION (1) It is an object of the present invention to provide an image processing device for identifying an image region including each pixel of a document image, and performing a process for each pixel according to the identification result of the image region, wherein the image processing device comprises an edge detect means for detecting the pixels positioned in an edge portion of an image by calculating a sum of products of each image signal of a local block comprising an observation pixel and a plurality of peripheral pixels with said observation pixel positioned at the center thereof multiplied by a filter coefficient having a sum of −1, and an identification means for identifying the image region including said observation pixel based on the detection result of said edge detect means.

In said image processing device, the edge pixel positioned at the edge portion of an image is detected by calculating a sum of products of each image signal of a local block comprising an observation pixel and a plurality of peripheral pixels with said observation pixel at the center multiplied by a filter coefficient having a sum of −1. When a filter whose sum of filter coefficient is −1 is used for edge detection, only the edge portion of the low density regions such as the letter region and the dot region of the document is detected, and no edge portions would be detected at the photograph regions. Therefore, by performing the edge detection to a plurality of pixels included in the local block using a filter whose sum of filter coefficient is −1, it could be identified whether the observation pixel is of an image of a low density region.

(2) It is another object of the present invention to provide an image processing device characterized in that said identification means identifies whether the observation pixel is included in a photograph region based on the binary coded data of the detection results of the edge detect means by a predetermined threshold.

In said image processing device, the image signal intensified by using a filter whose sum of filter coefficient is −1 for a plurality of pixels included in the local block is binary coded by a predetermined threshold in order to identify accurately whether the observation pixel is included in the photograph region.

(3) It is another object of the present invention to provide an image processing device characterized in that said identification means calculates a continuation number of the pixels positioned at the edge portion in the local block, and based on this calculated result, identifies whether the observation pixel is included in a photograph region, a letter region, or a dot region.

In said image processing device, the continuation number of the edge portion pixels detected in the local block with the observation pixel of a low density region which is either a letter region or a dot region positioned at the center thereof is counted. At the local block with the observation pixel included in the photograph region, no edge pixel could be detected, and at the local block with the observation pixel included in the letter region, the continuation number of the edge portion pixels is large, and at the local block with the observation pixel included in the dot region, the continuation number of the edge portion pixels is small. Therefore, whether the observation pixel is included in a photograph region, a letter region, or a dot region could be identified accurately by the continuation number of the edge portion pixel in the local block including the observation pixel being either 0, large value, or small value.

(4) It is another object of the present invention to provide an image processing device characterized in that said identification means identifies whether or not the observation pixel is included in a picture region based on the binary coded data of the detection result of the edge detect means by a predetermined threshold, when the observation pixel is not included in the photograph region, calculates the continuation number of the pixels positioned at the edge portion in the local block and based on the calculation results, identifies whether the observation pixel is included in a letter region or a dot region.

In said image processing device, when no edge portion pixels exist in the local block of the observation pixel, and the observation pixel is included in the picture region, the continuation number of the edge portion pixels in the local block are not counted, and the identification process in the case where the observation pixel is included in the photograph region is simplified.

(5) It is another object of the present invention to provide an image processing device characterized in that said identification means comprises a plural number of tables with the continuation number of the pixels in the edge portion of the local block as parameter and which determines the regional border of each of a photograph region, a letter region and a dot region with a plurality of feature quantities showing the characteristics of said each regions as parameter, wherein the identification means calculates the continuation number of the pixels at the edge portion and the plurality of feature quantity based on the image signal of the local block, and selects a table according to the calculated continuation number of the pixels positioned at the edge portion, and identifies whether the observation pixel specified by the plurality of feature quantities is included in either the picture region, the letter region or the dot region.

In said image processing device, a table is selected by the continuation number of the edge portion pixels in the local block with the observation pixel at the center, and based on the regional border of the selected table and the plurality of feature quantities, the image region where the observation pixel is included is determined accurately.

PREFERRED EMBODIMENT OF THE INVENTION

Figure 1:
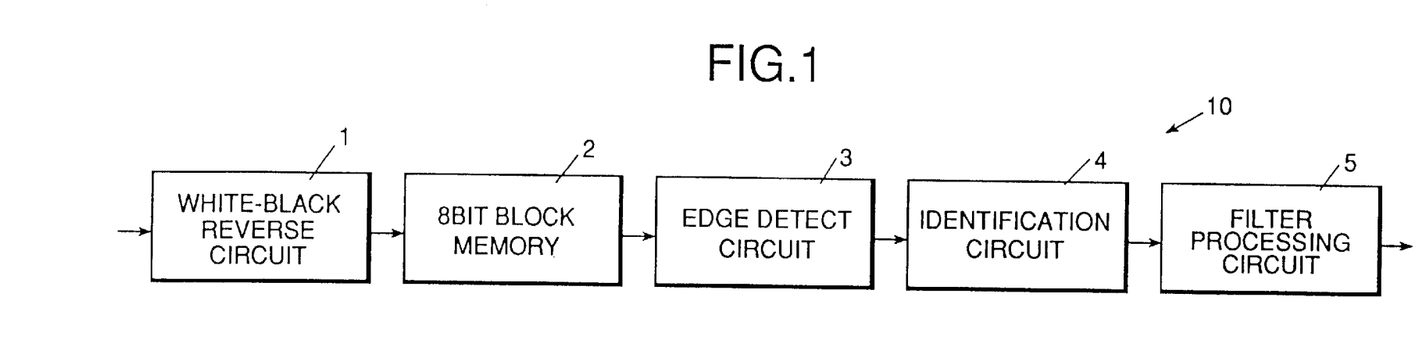
FIG. 1 is a block diagram showing the structure of the image processing device according to the first embodiment of the present invention.
Figure 2:
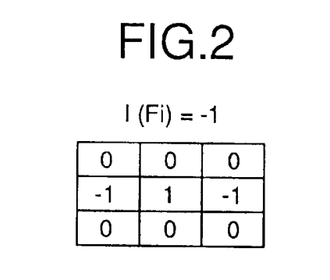
FIG. 2 shows one example of a filter to be used for edge detection in said image processing device.

FIG. 1 is a block diagram showing the structure of the image processing device according to the first embodiment of the present invention. The image processing device 10 comprises a white-black reverse circuit 1, a block memory 2, an edge detect circuit 3, an identification (a discrimination) circuit 4 and a filter processing circuit 5. The white-black reverse circuit 1 reverses the image signal inputted from the input terminal with an intermediate density value (128 when the input signal is 8 bit) at the center of reverse. The block memory 2 has a memory region for storing the image signal inputted from the white-black reverse circuit 1, wherein each pixel is stored by 256 level (8 bit). The edge detect circuit 3 calculates the edge level of the image signal stored in block memory 2 by a space filtering process, and seeks the edge information which has been binary coded by a fixed threshold processing as a feature quantity. As shown in FIG. 2, for example, a filter with a filter coefficient sum of −1 is used as the filter for detecting the edge in the edge detect circuit 3.

The identification circuit 4 is a circuit for determining whether the observation pixel inside the block is of a photograph region or not by the feature quantity, and said circuit outputs an identification signal according to each region. The filter circuit 5 selects the most suitable filter based on the output of the identification circuit 4, and performs a spacial filtering process against the input signal. The filter processing circuit 5 comprises a smoothing filter which performs a smoothing process by taking a weight mean value of the observation pixel and a proximity pixel for reducing the signal level change between said observation pixel and said proximity pixel, and an intensifying filter for performing an intensifying process by adding to the observation pixel the differential value between the proximity pixel for increasing the signal level change between said observation pixel and said proximity pixel.

Figure 3A:
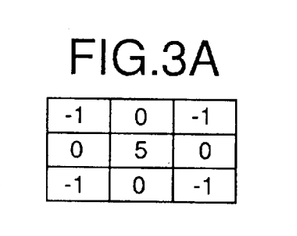
FIGS. 3A and 3B are examples of a filter used in a spacial filtering process in said image processing device.
Figure 3B:
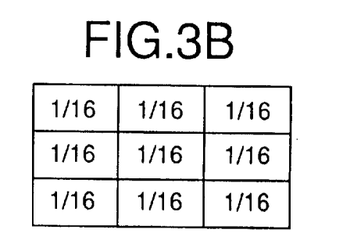

Further, said 8 bit block memory 2 could also be used as an n bit block memory for storing the maximum density value ($2^n$). Also, the filter processing circuit 5 selects either the intensifying filter or the smoothing filter with a predetermined filter coefficient, and performs either the intensifying process or the smoothing process to the observation pixel. An example of the intensifying filter used in this filter processing circuit 5 is shown in FIG. 3A, and an example of the smoothing filter is shown in FIG. 3B. Further, an optional filter which is different in mask size and filter coefficient as the example shown in FIG. 3A and 3B could also be used.

Figure 4:
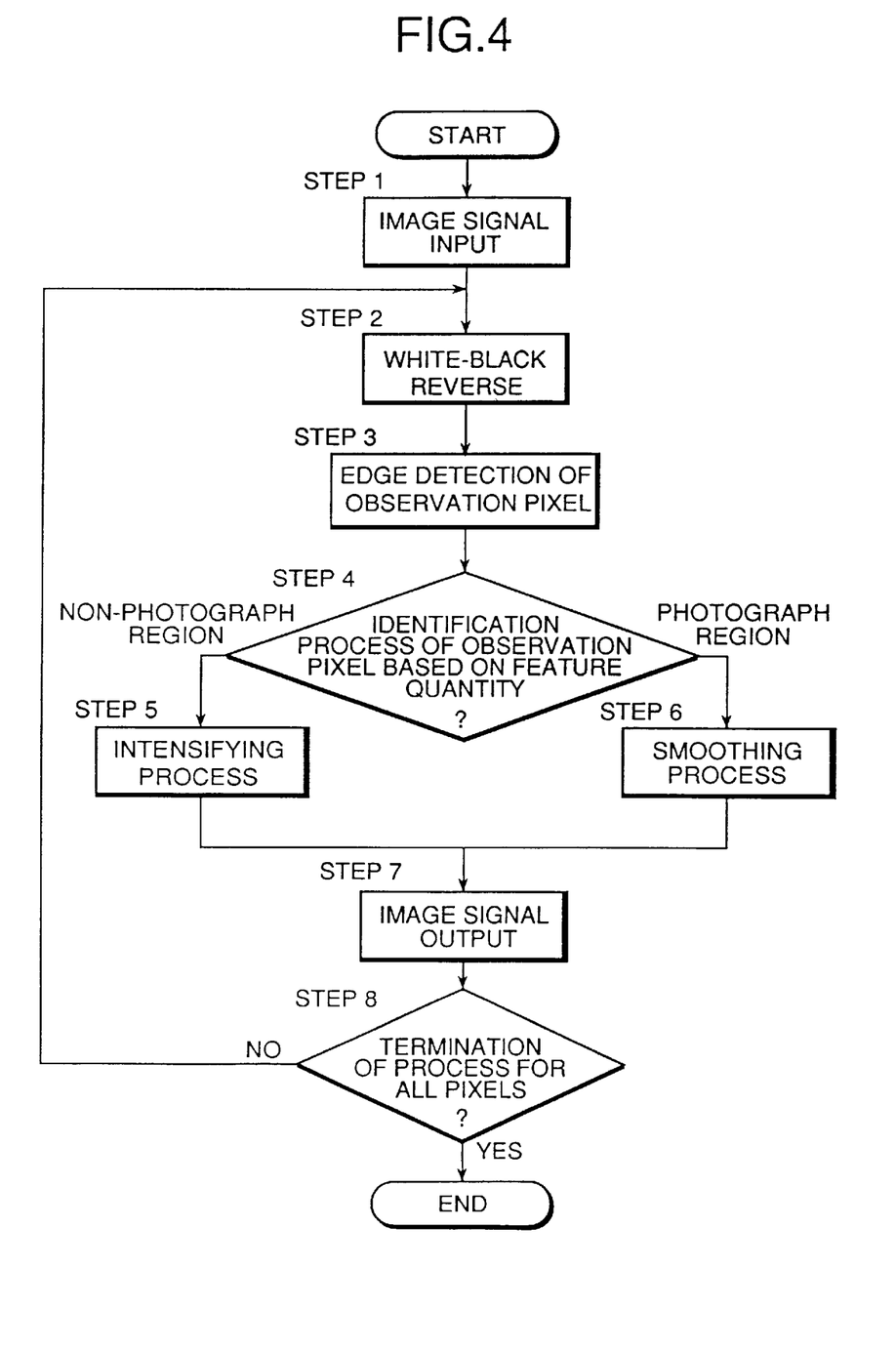
FIG. 4 is a flow chart showing the processes of said image processing device.

FIG. 4 is a flow chart showing the process of the spacial filtering process for improving the image quality of the recorded image in the above image processing device. When the image signal gained by scanning a document by an image reading portion not shown including a CCD image sensor is inputted to the image processing device (Step 1), the image signal is reversed of its white-black information by the white-black reverse circuit 1 (Step 2). Next, the image signal of a local block with the observation pixel at its center is selected from the block memory 2, and an edge detect density is calculated as the feature quantity by the spacial filtering process using the filter shown in FIG. 2 at the edge detect circuit 3 (Step 3). After that, the identification circuit 4 identifies whether the observation signal inside the block is of a photograph region or not based on each feature quantity. In the present embodiment, said observation pixel is identified as the photograph region when no edge is detected, and is identified as a letter region or a dot region when an edge is detected (Step 4). As a result, the filter processing circuit 5 performs the intensifying process when it is identified as either the letter region or the dot region (Step 5), and the circuit performs the smoothing process when it is identified as the photograph region (Step 6), before outputting the image signal (Step 7). Further, the spacial filtering process may not be performed for the photograph region before outputting the image signal. The image processing device 10 performs said steps Step 2 through Step 7 for all pixels in order (Step 8).

By the above process, the image processing device 10 of the present embodiment can identify the types of image by a very simple structured circuit, and for example, when gaining an image quality with a large portion of a photograph by forming a copied image in a copying machine by a photograph mode, the present device could provide a high quality image by accurately identifying the letter region without detecting an edge portion inside a photograph region, improving the identification accuracy.

Figure 5A:
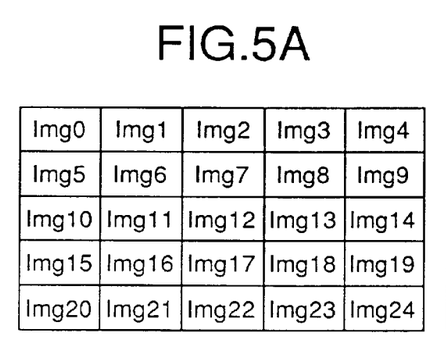
FIGS. 5A and 5B explain the products sum arithmetic of the image signal and the filter coefficient for edge detection in said image processing device.
Figure 5B:
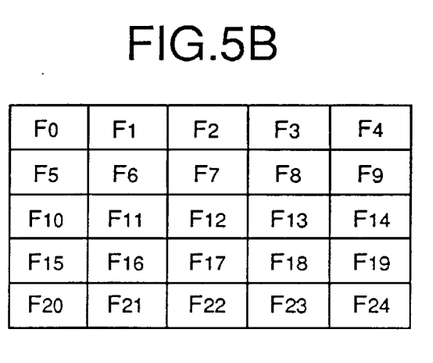

The reason for this is explained below referring to FIGS. 5A, 5B and 6A to 6K. In a general spacial filtering process, an edge detection density value is calculated by performing an intensifying process to the 5 pixel×5 pixel image signal as shown in FIG. 5A with a filter coefficient shown in FIG. 5B, for example. In the example shown in FIG. 5A, the edge detection density value Img12' after performing a spacial filtering process to the observation pixel image signal Imgl2 positioned at the center thereof could be gained by;
Imag12'=Σ(Imagi X Fi)
By comparing the edge detection density value Img12' calculated by the above expression and the threshold, it could be determined whether the observation pixel is a edge portion or not.

Figure 6A:
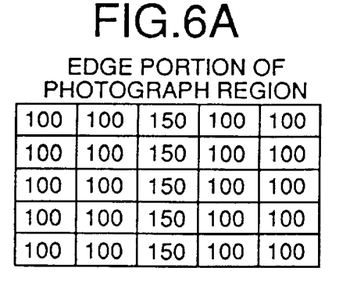
FIGS. 6A, 6B, 6C, 6D, 6E, 6F, 6G, 6H, 6I, 6J and 6K are explanatory views showing the status of edge detection of said image processing device with comparison to the prior art.
Figure 6B:
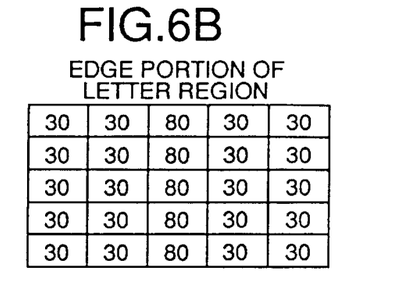
Figure 6C:
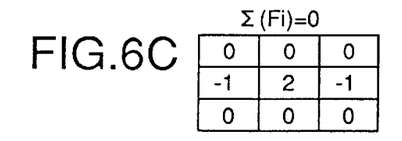
Figure 6D:
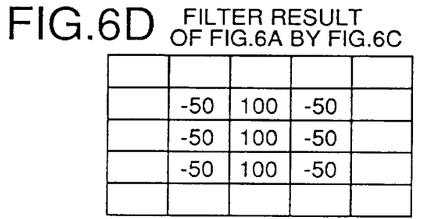
Figure 6E:
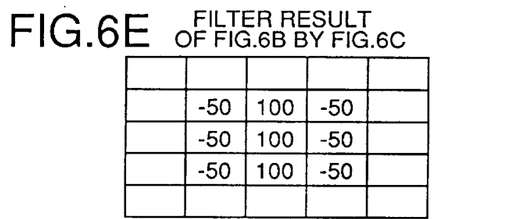
Figure 6F:
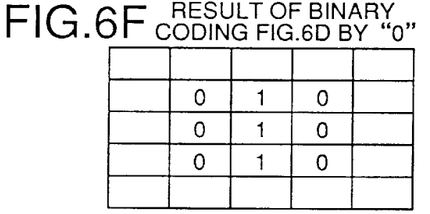
Figure 6G:
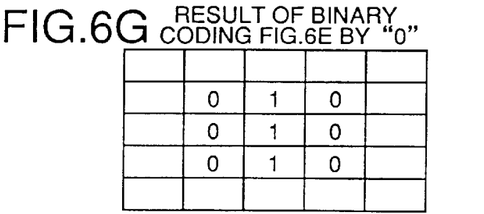

For example, when a spacial filtering process is performed to the image signal of a photograph region shown in FIG. 6A and the image signal of a letter region shown in FIG. 6B using a Laplacian filter (refer to FIG. 6C) which is a generally used prior art edge detection filter with a filter coefficient sum of 0, the image signal shown in FIGS. 6A and 6B are intensified as is shown in FIGS. 6D and 6E, and when they are binary coded by a threshold "0", the edge detection results shown in FIGS. 6F and 6G are gained, wherein an edge portion is detected even in the photograph region. Therefore, in the spacial filtering process using a Laplacian filter, the observation pixel could not be identified whether it is a photograph region or not by the existence of the edge portion.

Figure 6H:
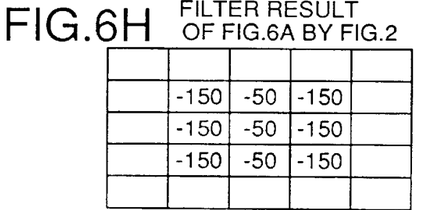
Figure 6I:
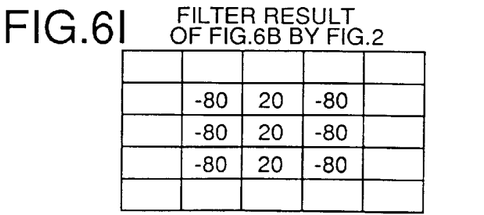
Figure 6J:
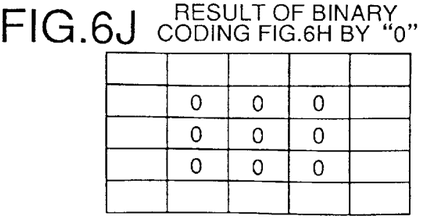
Figure 6K:
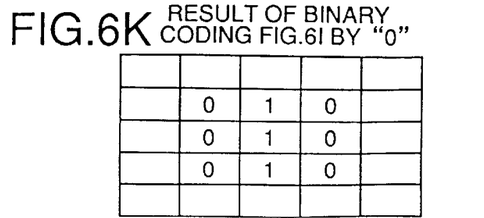

In contrast, when a spacial filtering process is performed using the filter with a filter coefficient sum of −1 as is shown in FIG. 2 which is used in the edge detect circuit 3 of the image processing device 10, the image signal shown in FIGS. 6A and 6B are intensified as shown in FIGS. 6H and 6I, and when they are binary coded by a threshold (0), the edge detection results shown in FIGS. 6J and 6K are gained, wherein no edge portion is detected in the photograph region. Therefore, in the identification circuit 4 of the image processing device 10, in the local block including the observation pixel positioned at the center thereof and peripheral pixels, it could easily be identified whether the observation pixel is a photograph region or not by the existence of the edge portion.

Figure 7:
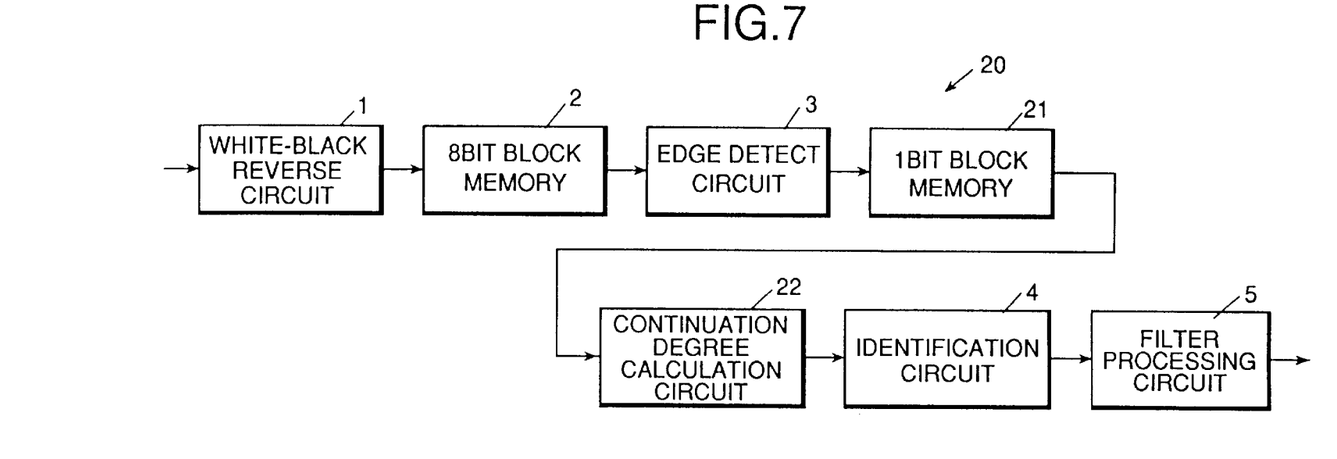
FIG. 7 is a block diagram showing the structure of the image processing device according to the second embodiment of the present invention.

FIG. 7 is a block diagram showing the structure of the image processing device according to the second embodiment of the present invention. The image processing device 20 shown in FIG. 7 comprises a one bit block memory 21 and a continuation degree calculation circuit 22 positioned between the edge detect circuit 3 and the identification circuit of the image processing device 10 shown in FIG. 1, and the components of the image processing device 20 which are the same as that of the image processing device 10 have the same reference numbers, the explanation of which are omitted.

Figure 8A:
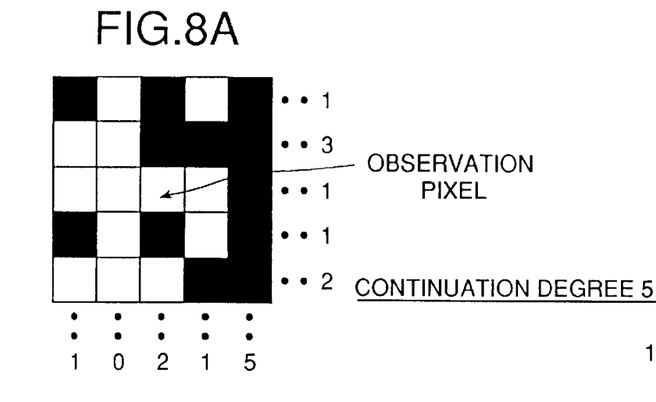
FIGS. 8A and 8B explain the process of the continuation degree calculation circuit of said image processing device.

A block memory 21 is equipped with a one bit×block size memory region for storing the binary data outputted from the edge detection circuit 3. The continuation degree calculation circuit 22 calculates the number of continuing proximate pixels in the edge having the same level for all directions (the main scan direction and the sub scan direction) based on the stored data in the block memory 21, and gains the maximum distance of the number of continuing pixels as the feature quantity of the observation pixel. For example, as is shown in FIG. 8A, when the block size is 5 pixel×5 pixel and when the edge information detected in the edge detect circuit 3 is shown by a black color and the non-edge information is shown by a white color (in practice, the edge information is "1" and the non-edge information is "0"), the continuation degree of the first line in the main scan direction is 1 since no proximate pixels has been detected as the edge, and the continuation degree of the second line is 3 since three proximate pixels are detected as edge. The same process is performed for all the lines in the main scan direction and the sub scan direction, and the maximum amount becomes the continuation degree of the observation pixel.

In the example shown in FIG. 8A, the continuation degree of the fifth line in the sub scan direction is 5, and therefore the continuation degree of the observation pixel is 5. The identification circuit 4 identifies, based on the calculation result of the continuation degree by the continuation degree calculation circuit 22, that the observation pixel with a high continuation degree is a letter region, the ones with a continuation degree of 0 is the photograph region, and the ones with other continuation degree is the dot region.

Figure 9:
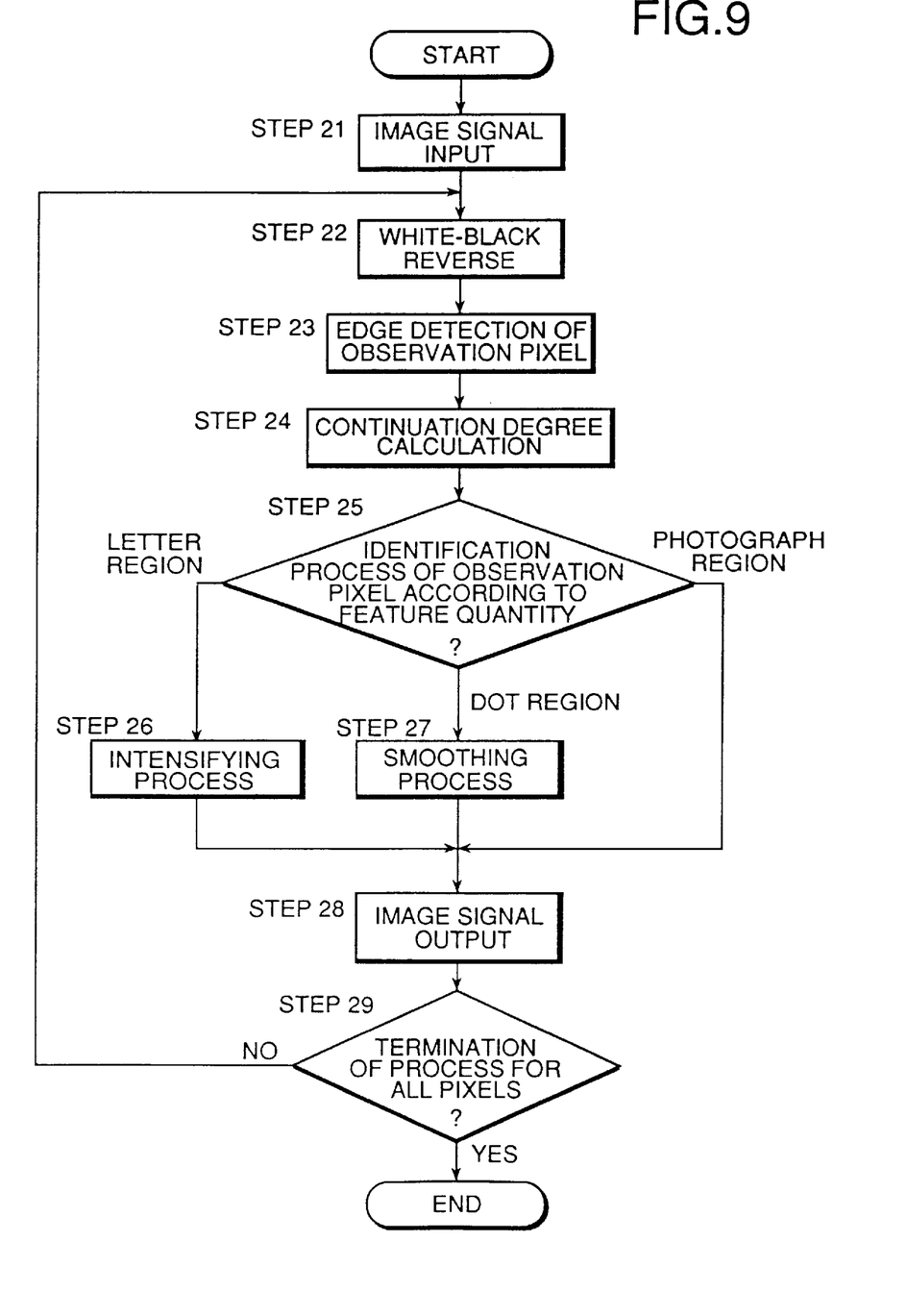
FIG. 9 is a flow chart showing the processes of said image processing device.

FIG. 9 is a flow chart showing the spacial filtering processing steps in the said image processing device. When the image signal gained by scanning the document by the image reading portion not shown including a CCD image sensor is inputted to the image processing device (Step 21), the image signal is reversed of its color at the white-black reverse circuit 1 (Step 22). Next, the image signal of the local block having the observation pixel at the center thereof is selected from the block memory 2, and the feature quantity is calculated at the edge detection circuit 3 (Step 23). In the edge detection step, a filter with a filter coefficient sum of −1 is used. The edge information detected at the edge detect circuit 3 of the peripheral pixels with the observation pixel positioned at its center is stored in the block memory 21, and based on the edge information of the pixel corresponding to one block stored in the block memory 21, the feature quantity is gained by calculating the continuation degree of the observation pixel at the continuation degree calculation circuit 22 (Step 24).

Then, in the identification circuit 4, the identification whether the observation pixel in the block is a picture region, a letter region or a dot region is performed based on the feature quantity outputted from the continuation degree calculation circuit 22 (Step 25). As a result, the filter processing circuit 5 performs either the intensifying process using the intensifying filter when it is identified as a letter region (Step 26) or the smoothing process using the smoothing filter when it is identified as a dot region (Step 27), and performing no spacial filtering when it is identified as a photograph region, before outputting the image signal (Step 28). The image processing device 20 performs the above steps (Step 22 through Step 28) to all the pixels in order (Step 29).

As was explained above, the image processing device 20 according to the present embodiment performs the identification process to the image signal gained by scanning the document on whether each pixel is either a letter region, a dot region or a photograph region, and according to the identification result, performs the spacial filtering process to each pixel. By such process, the image type could be identified very easily with high accuracy. That is, by using the filter of FIG. 2 in the edge detecting process of the edge detection circuit 3, the continuation degree in the photograph region is always 0 since no edge will be detected in the photograph region, the continuation degree will not be above 4 in the dot region, and the continuation degree in the letter region will be high, so the identification process could be performed easily with high accuracy.

Figure 8B:
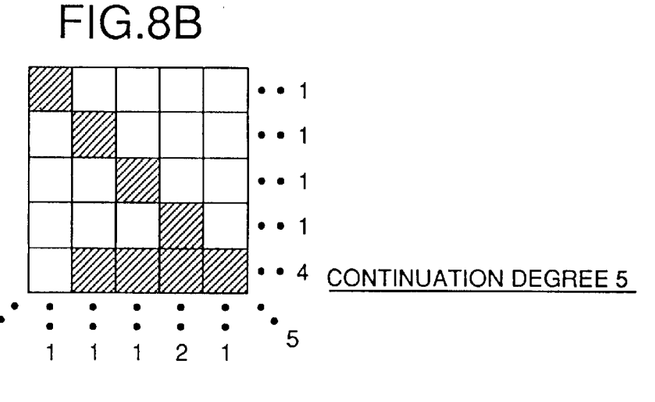

Further, in the above embodiment, the calculation of the continuation degree in the continuation degree calculation circuit 22 was performed in two directions, the main scan direction and the sub scan direction, inside the local block. However, the continuation degree in the diagonal directions inside the block could also be calculated, as is shown in FIG. 8B. By doing so, the continuation degree as the feature quantity of the observation pixel could be gained in high accuracy.

Figure 10:
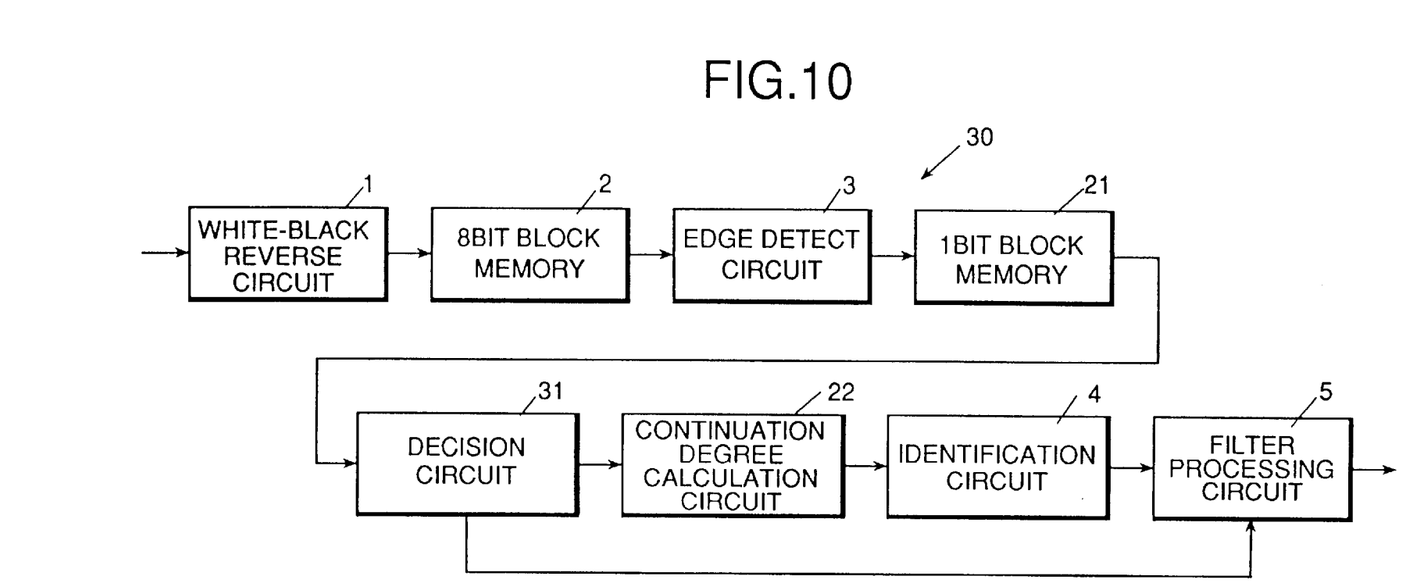
FIG. 10 is a block diagram showing the structure of the image processing device according to the third embodiment of the present invention.

FIG. 10 is a block diagram showing the structure of the image processing device according to the third embodiment of the present invention. The image processing device 30 shown in FIG. 10 is equipped with a decision circuit 31 positioned between the block memory 21 and the continuation degree calculation circuit 22 of the image processing device 20 shown in FIG. 7. The components of the image processing device 20 which are the same as that of the image processing device 20 have the same reference numbers, and the explanation thereof are omitted. The decision circuit 31 decides whether the observation pixel is a photograph region or not by the existence of the edge portion of the pixels in one block stored in the block memory 21.

Figure 11:
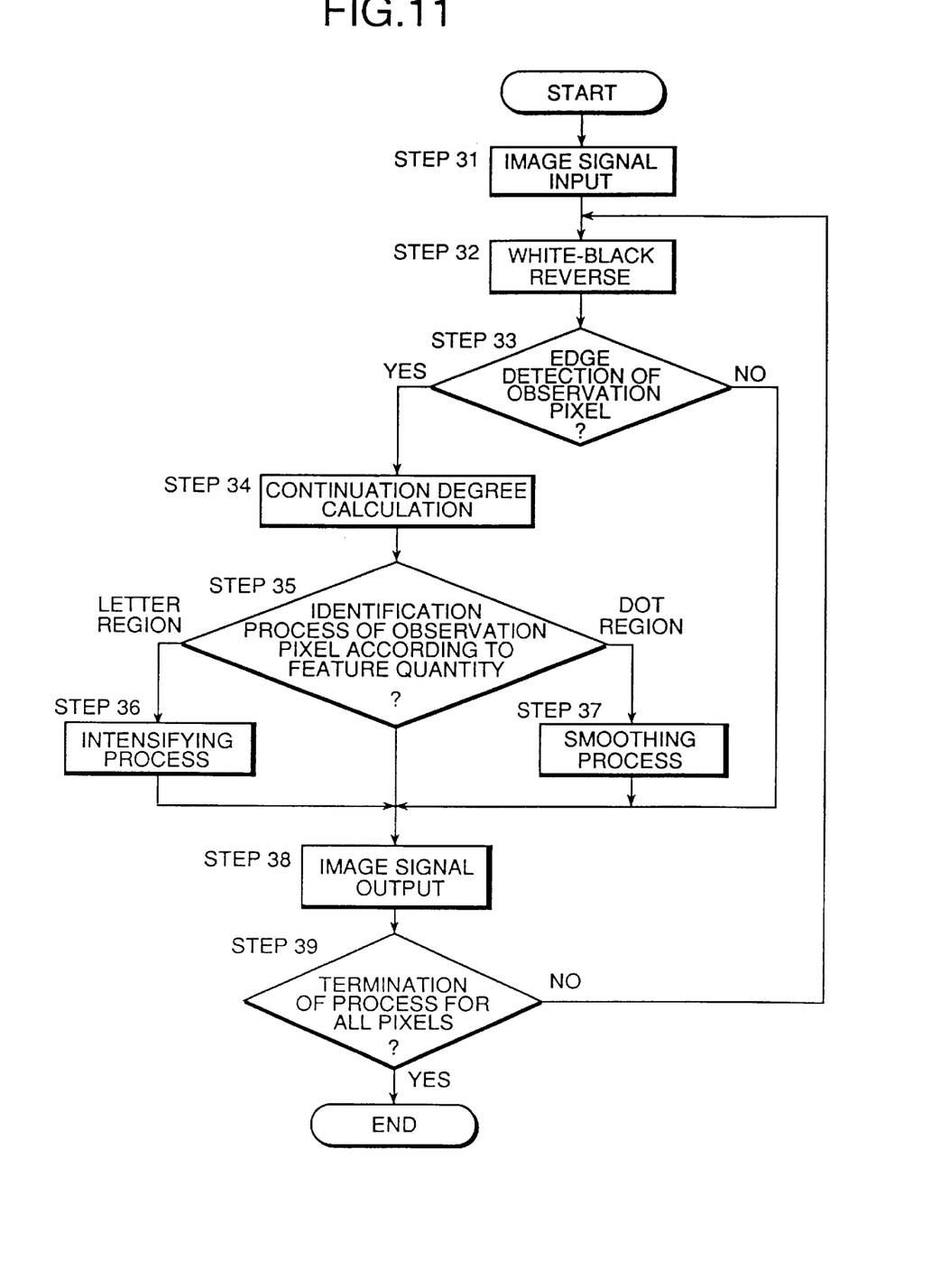
FIG. 11 is a flow chart showing the processes of said image processing device.

FIG. 11 is a flow chart showing the spacial filtering process steps in said image processing device. When the image signal gained by scanning the document by the image reading portion not shown including a CCD image sensor is inputted to the image processing device (Step 31), the image signal is reversed of its color at the white-black reverse circuit 1 (Step 32). Next, the image signal of the local block having the observation pixel at the center thereof is selected from the block memory 2, and the edge information showing whether it is an edge portion or not is calculated at the edge detect circuit 3 (Step 33). In the edge detection step, a filter with a filter coefficient sum of −1 is used.

When an edge is detected inside the local block at the edge detection circuit 3, the edge information of the peripheral pixels with the observation pixel positioned at its center detected at the edge detect circuit 3 is stored in the block memory 21, and based on the edge information of the pixel corresponding to one block stored in the block memory 21, the continuation degree of the observation pixel is calculated as the feature quantity at the continuation degree calculation circuit 22 (Step 34). Next, in the identification circuit 4, the identification whether the observation pixel inside the block is a picture region, a letter region or a dot region is performed based on the feature quantity outputted from the continuation degree calculation circuit 22 (Step 35).

As a result, the filter processing circuit 5 performs either the intensifying process using the intensifying filter when it is identified as a letter region (Step 36) or the smoothing process using the smoothing filter when it is identified as a dot region (Step 37), before outputting the image signal (Step 38). When no edge is detected inside the local block by the edge detect circuit 3, the observation pixel is determined as a photograph region, and no spacial filtering is performed before outputting the image signal. The image processing device 30 performs the above steps (Step 32 through Step 38) to all the pixels in order (Step 29).

As was explained above, the image processing device 30 of the present embodiment decides promptly that the observation pixel is a photograph region when no edge portions exist inside the local block after the spacial filtering process is performed by the edge detect circuit 3, performing no calculation process of the continuation degree for the photograph region. Therefore, the identification process on whether each pixel of the image signal gained by scanning the document is a letter region, a dot region or a photograph region could be performed in a shorter period of time.

Further, in the above embodiment, the calculation of the continuation degree in the continuation degree calculation circuit 22 was performed in two directions, the main scan direction and the sub scan direction, inside the local block. However, the continuation degree in the diagonal directions inside the block could also be calculated.

Figure 12:
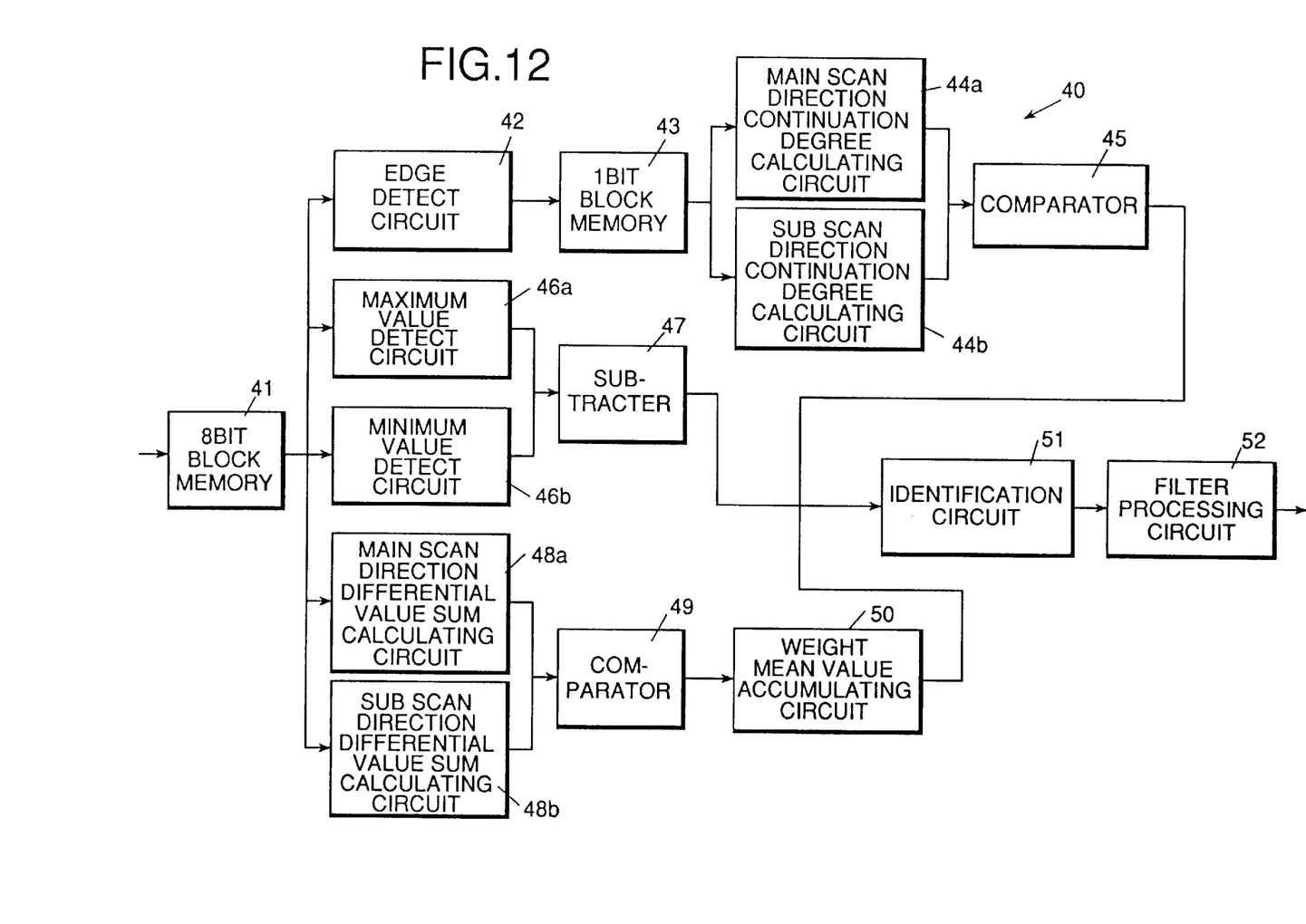
FIG. 12 is a block diagram showing the structure of the image processing device according to the fourth embodiment of the present invention.

FIG. 12 is a block diagram showing the structure of the image processing device according to the fourth embodiment of the present invention. An image processing device 40 shown in FIG. 12 comprises of a block memory 41, a first feature quantity calculating means including an edge detect circuit 42, a block memory 43, a main scan direction continuation degree calculating circuit 44a, a sub scan direction continuation degree calculating circuit 44b and a comparator 45, a second feature quantity calculating means including a maximum value detect circuit 46a, a minimum value detect circuit 44b and a subtracter 47, a third feature quantity calculating means including a main scan direction differential value sum calculating circuit 48a, a sub scan direction differential value sum calculating circuit 48b, a comparator 49 and a weight mean value accumulating circuit 50, an identification circuit 51, and a filter processing circuit 52.

The main scan direction continuation degree calculating circuit 44a, the sub scan direction continuation degree calculating circuit 44b and the comparator 45 constituting the first feature quantity calculating means perform the same process as the continuation degree calculating circuit 22 of the image processing device 20 shown in FIG. 7. The image processing device 40 utilizes not only the continuation degree calculated by the first feature quantity calculating means, but also the maximum density difference inside the block calculated by the second feature quantity calculating means and the complexity level calculated by the third feature quantity calculating means, in order to further improve the identification accuracy of the image region.

Figure 13:
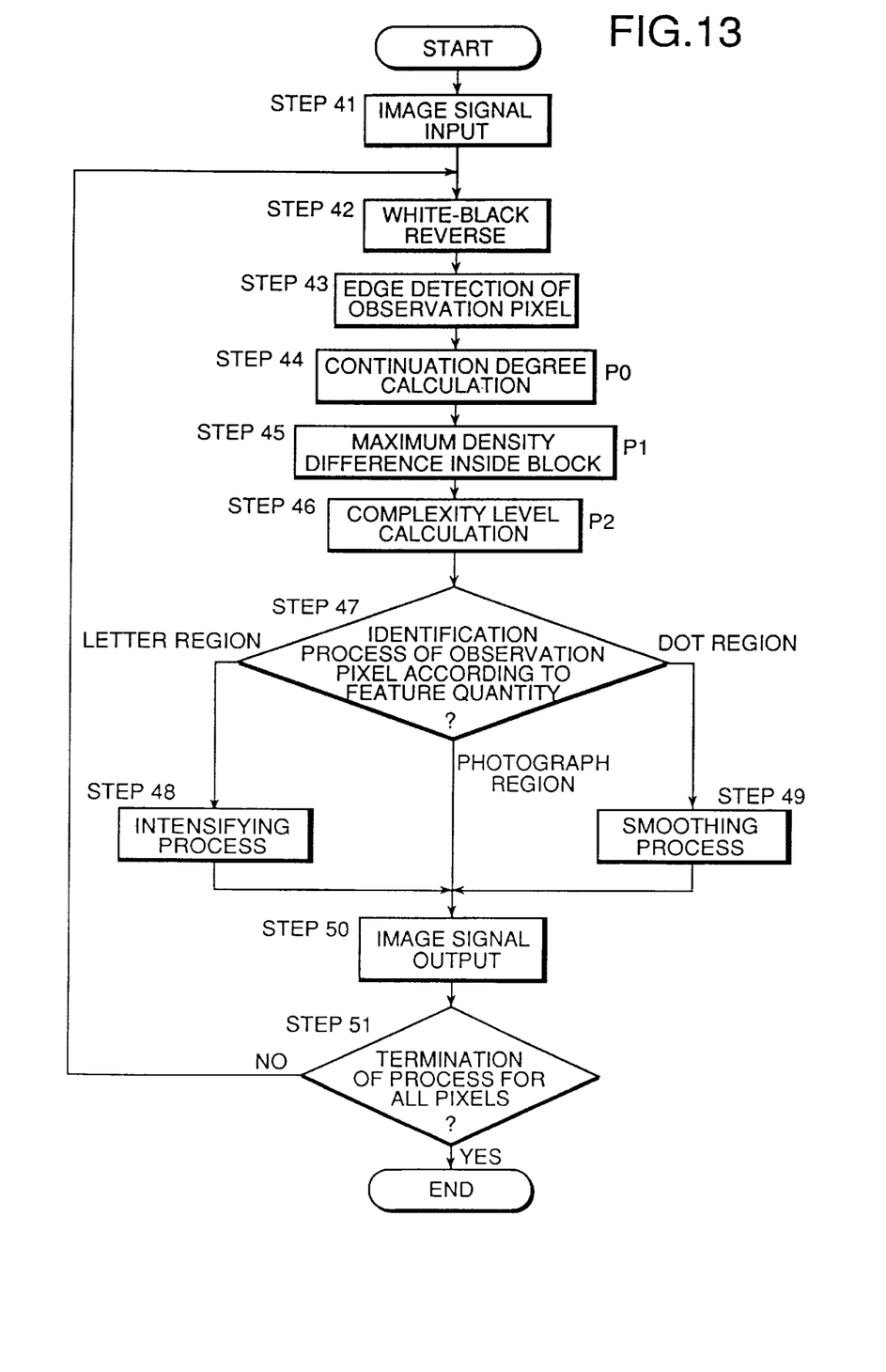
FIG. 13 is a flow chart showing the processes of said image processing device.

FIG. 13 is a flow chart showing the steps of the spacial filtering process in the above image processing device. When the image signal gained by scanning the document by the image reading portion not shown including a CCD image sensor is inputted to the image processing device 40 (Step 41), the image signal is reversed of its color (Step 42) before being stored inside the block memory 41. In the block memory 41, the image signals corresponding to peripheral pixels of 7 pixel×7 pixel with the observation pixel positioned at the center thereof is stored for example. An edge detecting process is performed with respect to the image signal stored inside the block memory 41 by the edge detect circuit 42 (Step 43). The edge information of the peripheral pixels with the observation pixel positioned at the center thereof detected by the edge detect circuit 42 is binary coded before being stored in the block memory 43.

When a filter of 3 pixel×3 pixel as shown in FIG. 2 is used for the edge detecting process of Step 43, the pixels positioned at the end portions of the 7 pixel×7 pixel block can not be positioned at the center of the filter. Therefore, the effective range of edge detection becomes 5 pixel×5 pixel, and the edge information of the local block of 5 pixel×5 pixel with the observation pixel positioned at the center thereof will be stored in the block memory 43.

Next, by the main scan direction continuation degree calculating circuit 44a, the sub scan direction continuation degree calculating circuit 44b and the comparator 45, the continuation degree of the observation pixel is calculated as the first feature quantity PO based on the edge information of the pixels included in one block stored in the block memory 43 (Step 44). Also, by the maximum value detect circuit 46a, the minimum value detect circuit 44b and the subtracter 47, the difference between the maximum signal level and the minimum signal level of the 7 pixel×7 pixel image signal stored in the block memory 41 is calculated as the second feature quantity P1 (Step 45). Further, by the main scan direction differential value sum calculating circuit 4:8a, the sub scan direction differential value sum calculating circuit 48b, the comparator 49 and the weight mean value accumulating circuit 50, the complexity level which is a smaller value of the sum calculated by adding the differences of the image signals between each two pixels positioned next to each other in the main scan direction and the sub scan direction respectively of the 7 pixel×7 pixel block stored in the block memory 41 is calculated as the third feature quantity P2 (Step 46).

Figure 14:
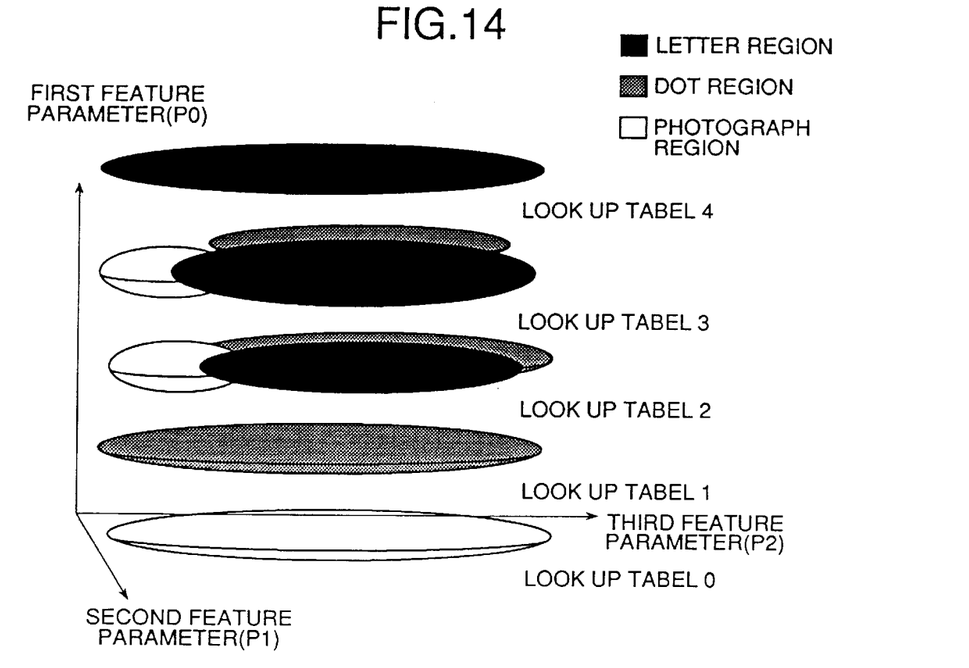
FIG. 14 shows examples of the table prepared in the identification circuit of said image processing device.
Figure 15:
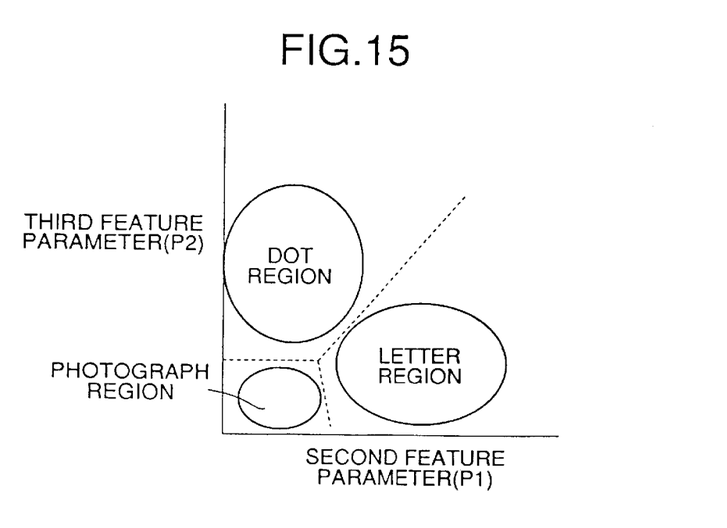
FIG. 15 shows one example of the regional border in the table prepared in the identification circuit of said image processing device.

The first feature quantity PO, the second feature quantity P1 and the third feature quantity P2 will be inputted in the identification circuit 51, and the identification circuit 51 identifies whether the observation pixel inside the block is included in a photograph region, a letter region or a dot region based on these feature quantities (Step 47). That is, based on the first feature quantity PO, the identification circuit 51 selects a most suitable look-up table from the plurality of look-up tables prepared as shown in FIG. 14, and based on the selected look-up table with reference to the second feature quantity P2 and the third feature quantity P3, identifies whether the observation pixel is included in a letter region, a dot region or a photograph region, from the regional border shown in FIG. 15.

As a result, the intensifying process is performed using the intensifying filter when it is identified as the letter region (Step 48) and the smoothing process is performed using the smoothing filter when it is identified as the dot region (Step 49) by the filter processing circuit 52, and no spacial filtering process is performed for the photograph region before outputting the image signal (Step 50). The image processing device 40 performs the above processes Step 42 through Step 50 for all pixels in order (Step 51).

As was explained above, the image processing device 40 according to the present embodiment utilizes the continuation degree of the edge information in the local block with the observation pixel positioned at the center thereof as the first feature quantity, and further utilizes the maximum density difference as the second feature quantity and the complexity level as the third feature quantity in a supportive manner, in order to perform the identification process of the image region from plural directions. This enables the identification process of the image region in a very high accuracy.

Further, the data used as the second feature quantity and the third feature quantity are not limited to the maximum density difference and the complexity level.

According to the present invention, by detecting the edge pixel positioned at the edge portion of the image by calculating the sum of products of each image signal of a local block comprising the observation pixel and a plurality of peripheral pixels with said observation pixel positioned at the center thereof multiplied by the filter coefficient having a sum of −1, only the edge portion of a low density region will be detected without detecting an edge portion at the photograph region, so as to identify with a very simple structure whether the observation pixel is included in the image of a low density region.

According to the present invention, by binary coding the image signal gained by intensifying the plurality of pixels included in the local block by the filter whose sum of filter coefficient is −1 with a predetermined threshold, the identification whether the observation pixel is included in the photograph region or not could be performed accurately by a very simple structure.

According to the present invention, by calculating the continuation number of the pixels positioned in the edge portion inside the local block with the observation pixel included in the low density region which is either a letter region or a dot region, and by checking whether the continuation number of the edge portion pixel of the observation pixel inside the local block is either 0, a high value or a low value, the identification whether the observation pixel is included in either the photograph region, the letter region or the dot region could be performed accurately by a very simple structure.

According to the present invention, the identification process in the case where the observation pixel is included in the photograph region could be simplified by not calculating the continuation number of the edge pixels inside the local block when no edge pixel exists in the local block of the observation pixel.

According to the present invention, a suitable table is selected by the continuation number of the edge pixels inside the local block with the observation pixel positioned at the center there-of, and based on the regional border and the plurality of feature quantities of the selected table, the image region to which the observation pixel is included could be determined accurately.

What is claimed is:

1. An image processing device for identifying an image region including each pixel of a document image and performing processing on each pixel according to an identification result of the image region, the image processing device comprising:

edge detect means for detecting pixels positioned at an edge portion of an image by calculating a sum of products of each image signal of a local block multiplied by respective filter coefficients, the local block including an observation pixel and a plurality of peripheral pixels with the observation pixel positioned at a center of the local block, the filter coefficients corresponding to the local block having a sum of −1; and identification means for identifying the image region including the observation pixel based on a detection result of said edge detect means.

2. The image processing device of claim 1, wherein said identification means identifies whether the observation pixel is included in a photograph region based on binary coded data formed by comparing the detection result of said edge detect means with a predetermined threshold.

3. The image processing device of claim 1, wherein said identification means calculates a continuation number of the pixels positioned at the edge portion in the local block, and identifies whether the observation pixel is included in either a photograph region, a letter region, or a dot region based on the continuation number.

4. The image processing device of claim 1, wherein said identification means identifies whether the observation pixel is included in a photograph region based on binary coded data formed by comparing the detection result of said edge detect means with a predetermined threshold, upon determination that the observation pixel is not included in a photograph region, said identification means calculates a continuation number of the pixels positioned in the edge portion in the local block, and identifies whether the observation pixel is included in a letter region or a dot region based on the continuation number.

5. The image processing device of claim 1, wherein said identification means comprises a plurality of tables having a continuation number of pixels in the edge portion in the local block as a parameter and which determine a regional border of each of a photograph region, a letter region and a dot region with a plurality of feature quantities showing characteristics of each of the regions as a parameter, said identification means calculates the continuation number of the pixels at the edge portion and the plurality of feature quantities based on the image signal of the local block, and selects one of the plurality of tables according to the calculated continuation number of the pixels at the edge portion, and identifies whether the observation pixel specified by the plurality of feature quantities is included in either a picture region, a letter region or a dot region.

6. An image processing method for identifying an image region including each pixel of a document image and performing processing on each pixel according to an identification result of the image region, the image processing method comprising the steps of:

detecting pixels positioned at an edge portion of an image by calculating a sum of products of each image signal of a local block multiplied by respective filter coefficients, the local block including an observation pixel and a plurality of peripheral pixels with the observation pixel positioned at a center of the local block, the filter coefficients corresponding to the local block having a sum of −1; and identifying the image region including the observation pixel based on a detection result.

7. The image processing method of claim 6, wherein said step of identifying comprises identifying whether the observation pixel is included in a photograph region based on binary coded data formed by comparing a detection result with a predetermined threshold.

8. The image processing method of claim 6, wherein said step of identifying comprises calculating a continuation number of the pixels positioned at the edge portion in the local block, and identifying whether the observation pixel is included in either a photograph region, a letter region, or a dot region based on the continuation number.

9. The image processing method of claim 6, wherein said step of identifying comprises identifying whether the observation pixel is included in a photograph region based on binary coded data formed by comparing the detection result with a predetermined threshold, and calculating a continuation number of the pixels positioned in the edge portion in the local block upon determination that the observation pixel is not included in a photograph region, and identifying whether the observation pixel is included in a letter region or a dot region based on the continuation number.

10. The image processing method of claim 6, wherein said step of identifying comprises providing a plurality of tables having a continuation number of pixels in the edge portion in the local block as a parameter and which determine a regional border of each of a photograph region, a letter region and a dot region with a plurality of feature quantities showing characteristics of each of the regions as a parameter;

calculating the continuation number of the pixels at the edge portion and the plurality of feature quantities based on the image signal of the local block;

selecting one of the plurality of tables according to the calculated continuation number of the pixels at the edge portion; and identifying whether the observation pixel specified by the plurality of feature quantities is included in either a picture region, a letter region or a dot region.

11. An image processing device comprising:

an edge detector for determining an edge portion of an image by filtering image signals representative of the image using filter coefficients having a sum of −1 to provide a detection result; and an identifier for identifying the image as included in a photograph region or not based on the detection result.

12. The image processing device of claim 11, wherein the image signals comprise image signals of a local block including an observation pixel and a plurality of peripheral pixels with the observation pixel positioned at a center of the local block, said edge detector calculating a sum of products of each image signal of the local block multiplied by the respective filter coefficients to provide the detection result.

13. The image processing device of claim 12, wherein said identifier compares the detection result to a threshold to generate binary coded data and identifies the observation pixel as included in a photograph region based on the binary coded data.

14. The image processing device of claim 12, wherein said identifier determines a continuation number of pixels positioned at an edge portion in the local block and identifies whether the observation pixel is included in either a photograph region, a letter region or a dot region based on the continuation number.

15. The image processing device of claim 12, wherein said identifier compares the detection result to a threshold to generate binary coded data and identifies the observation pixel as included in a photograph region based on the binary coded data, upon determination that the observation pixel is not included in a photograph region, said identifier determines a continuation number of pixels positioned at an edge portion in the local block and identifies the observation pixel as included in either a letter region or a dot region based on the continuation number.

16. A method of image processing comprising the steps of:

determining an edge portion of an image by filtering image signals representative of the image using filter coefficients having a sum of −1 to provide a detection result; and identifying the image as included in a photograph region or not based on the detection result.

17. The method of image processing of claim 16, wherein the image signals comprise image signals of a local block including an observation pixel and a plurality of peripheral pixels with the observation pixel positioned at a center of the local block, said step of determining comprising calculating a sum of products of each image signal of the local block multiplied by the respective filter coefficients to provide the detection result.

18. The method of image processing of claim 17, wherein said step of identifying comprises comparing the detection result to a threshold to generate binary coded data and identifying the observation pixel as included in a photograph region based on the binary coded data.

19. The method of image processing of claim 17, wherein said step of identifying comprises determining a continuation number of pixels positioned at an edge portion in the local block and identifying whether the observation pixel is included in either a photograph region, a letter region or a dot region based on the continuation number.

20. The method of image processing of claim 17, wherein said step of identifying comprises comparing the detection result to a threshold to generate binary coded data and identifying the observation pixel as included in a photograph region based on the binary coded data, upon determination that the observation pixel is not included in a photograph region, determining a continuation number of pixels positioned at an edge portion in the local block and identifying the observation pixel as included in either a letter region or a dot region based on the continuation number.

* * * * *